United States Patent
Tashima

[11] 3,904,475
[45] Sept. 9, 1975

[54] SPRING SPACER DEVICE FOR RESILIENTLY SUPPORTING NUCLEAR FUEL RODS

[75] Inventor: Junichiro Tashima, Yokohama, Japan

[73] Assignee: Tokyo Shibaura Electric Co., Ltd., Japan

[22] Filed: Jan. 17, 1973

[21] Appl. No.: 324,386

[30] Foreign Application Priority Data
Jan. 19, 1972  Japan.................................. 47-8012

[52] U.S. Cl. ................................................. 176/78
[51] Int. Cl. ............................................. G21c 3/30
[58] Field of Search ................................ 176/78, 76

[56] References Cited
UNITED STATES PATENTS

| | | | |
|---|---|---|---|
| 3,379,617 | 4/1968 | Andrews et al. .................. | 176/76 X |
| 3,664,924 | 5/1972 | Krawiec ................................. | 176/78 |
| 3,674,635 | 7/1972 | Anthony et al. ...................... | 176/78 |

Primary Examiner—Stephen J. Lechert, Jr.
Assistant Examiner—P. A. Nelson
Attorney, Agent, or Firm—Oblon, Fisher, Spivak, McClelland & Maier

[57] ABSTRACT

Lantern type spring spacers which are mounted in a latticed frame by cross-pieces thereof, are respectively composed of square configured cylindrical end portions supported in the cross-pieces and four leaf spring members respectively provided between corresponding sides of the square cylindrical end portions. Each of the leaf springs includes flat end portions and a central outwardly bent portion which is projected against a nuclear fuel rod to be supported in the latticed frame. The flat end portions are made such that the coefficient of elasticity thereof is smaller than that of the central outwardly bent portion. The configuration of one of the leaf springs can thus be varied independently of the other leaf springs when an external force is added thereto by a fuel rod, so as to deform the leaf spring.

6 Claims, 4 Drawing Figures

SPRING SPACER DEVICE FOR RESILIENTLY SUPPORTING NUCLEAR FUEL RODS

BACKGROUND OF THE INVENTION

1. Field of the Invention

The present invention relates generally to spring spacer devices for supporting nuclear fuel rods in parallel spaced relation, and more particularly to an improved lantern type spring spacer for use therein.

2. Description of the Prior Art

Spring spacer devices for resiliently supporting nuclear fuel rods, in which the spring spacer device includes a latticed frame and a plurality of lantern type spring spacers mounted in the latticed frame to support the nuclear fuel rods, are well known. These lantern type spring spacers are usually composed of a pair of square cylindrical end portions and four leaf springs respectively provided between the corresponding sides of the square cylindrical end portions. The leaf spring heretofore has been made of an elongated metal strip so as to present a roof-shaped configuration between the square cylindrical end portions, in the side view thereof, and has had the same cross-section or width along the whole length thereof. Accordingly, the coefficient of elasticity of the leaf spring was equal throughout the whole length of the leaf spring.

As a result, if one of the leaf springs was pressed by a fuel rod so as to be deformed, the square cylindrical end portions were repelled in opposite directions so as to extend the other leaf springs, whereby there were undesirable spaces formed between the other fuel rods and the other leaf springs. These spaces allowed free vibration of the other fuel rods so that fretting has occurred on the surface of the fuel rods. In addition to this, the spaces between the fuel rods have been narrowed, such as to obstruct the coolant flow normally passing therethrough.

SUMMARY OF THE INVENTION

It is therefore an object of the present invention to provide a new, improved and unique spring spacer device for resiliently supporting nuclear fuel rods.

Another object of this invention is to provide a spring spacer device for resiliently supporting nuclear fuel rods, having an improved lantern type spring spacer in which elongation thereof does not occur when one of the leaf springs thereof is pressed by a fuel rod.

A further object of this invention is to provide a spring spacer device for resiliently supporting nuclear fuel rods, in which fretting of the fuel rod does not occur when one of the spring spacers forming the device is pressed by a fuel rod.

Still another object of this invention is to provide a spring spacer device for resiliently supporting nuclear fuel rods, in which the narrowing of spaces between the fuel rods does not occur to obstruct the coolant flow passing through the spaces when a spring spacer of the device is pressed by a fuel rod.

The foregoing objects and others are attained, in accordance with one aspect of the present invention, through the provision of a latticed frame having a rectangular side frame and a plurality of cross-peices mounted in the rectangular side frame to define a plurality of lattices through which nuclear fuel rods are respectively inserted. There are also provided a plurality of improved lantern type spring spacers, each of which includes a pair of square-configured cylindrical end portions supported on crossing points of the cross-pieces and four leaf springs respectively provided between corresponding sides of the cylindrical end portions, such that the leaf springs may respectively be positioned in the corresponding lattices adjacent to each other. Each of the leaf springs has flat end portions and a central outwardly bent portion projected against a nuclear fuel rod surface so as to be in contact therewith, and the flat end portions of the leaf spring are designed so that the coefficients of elasticity thereof are smaller than that of the central outwardly bent portion of the leaf spring.

BRIEF DESCRIPTION OF THE DRAWINGS

Other objects, features and attendant advantages of the present invention will be more fully appreciated as the same becomes better understood by reference to the following detailed description when considered in connection with the accompanying drawings wherein like reference numerals designate like or corresponding parts throughout the several views and illustrations and in which.

DETAILED DESCRIPTION OF THE PREFERRED EMBODIMENTS

Figure 1:
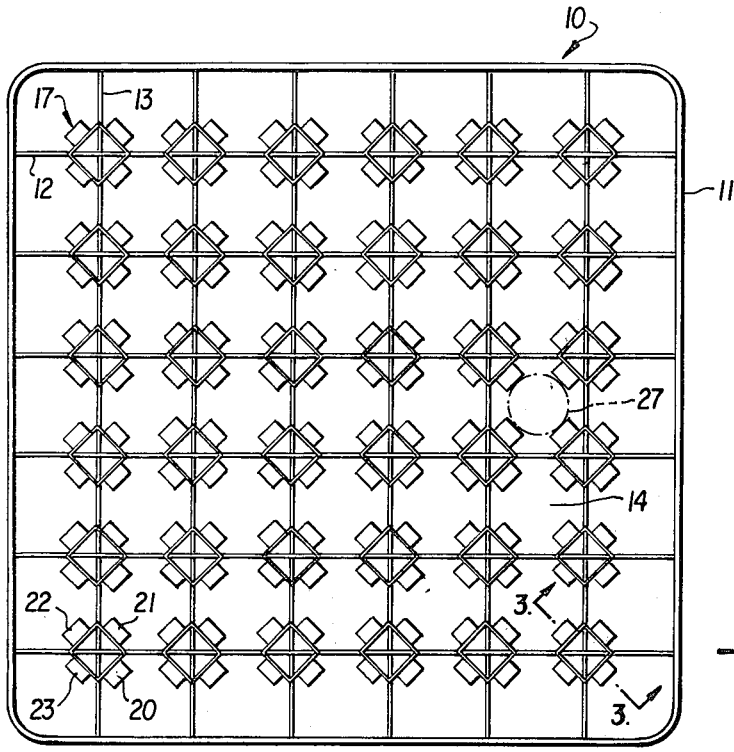
FIG. 1 is a plan view of an embodiment of a framework for resiliently supporting nuclear fuel rods, being constructed of spring spacer devices formed in accordance with this invention.

Referring now to the drawings, and more particularly to FIG. 1 thereof, the reference numeral 10 generally designates a latticed framework which includes rectangular side frame 11, a plurality of lateral cross-pieces 12 and a plurality of vertical cross-pieces 13. The cross-pieces 12 and 13 are connected with each other so as to construct a plurality of lattices 14 by engaging notches, not shown, provided thereon, and are mounted in the rectangular side frame 11 by welding.

Figure 2:
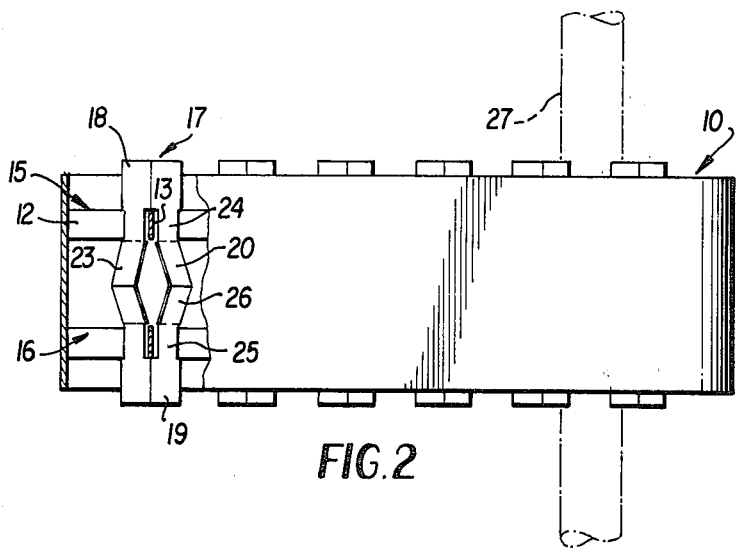
FIG. 2 is a front view, partly in section, of the apparatus shown in FIG. 1, being broken away to show more of the detail of the improved lantern type spring spacer device of the present invention.

As shown in FIG. 2, two such assemblies of the cross-pieces 12 and 13 are arranged in the rectangular side frame 11 so as to form double racks 15 and 16. A plurality of lantern type spring spacers 17 are provided in the latticed framework 10. Each of the lantern type spring spacers 17 comprises a pair of square cylindrical end portions 18 and 19 having four leaf springs 20, 21, 22 and 23 disposed therebetween, being arranged to join corresponding sides of the square end portions 18 and 19, respectively. Each of the leaf springs 20, 21, 22 and 23 respectively, includes a pair of flat end portions 24 and 25, lying in substantially the same plane, and a central outwardly bent portion 26.

The lantern type spring spacers 17 are supported on crossing points of the cross-pieces 12 and 13 of the two racks 15 and 16 by inserting cross-pieces 12 and 13 through corresponding spaces formed between opposing pairs of adjacent leaf springs 20, 21, 22 and 23. In this way, each of the leaf springs 20, 21, 22 and 23 are respectively positioned in the corresponding lattice 14 as shown in FIG. 1.

Nuclear fuel rods 27 are then inserted into the lattices 14 wherein they are resiliently supported by the lantern type spring spacers 17. For the convenience of illustration, only one fuel rod 27 is shown in FIG. 1.

The leaf springs 20, 21, 22 and 23 are integrally constructed with the square cylindrical end portions 18 and 19 by punching a thin, elastic metal sheet.

It can be seen in FIG. 2 that the flat end portions 24 and 25 of each of the leaf springs 20, 21, 22 and 23 are constructed so as to have a smaller cross-section or width than that of the central outwardly bent portion 26. Accordingly, the coefficient of elasticity of the flat end portions 24 and 25 is smaller than that of the central bent portion 26.

Figure 3:
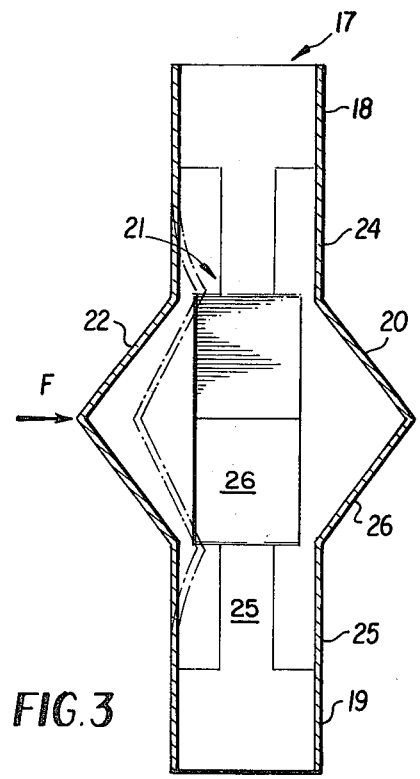
FIG. 3 is an enlarged elevational section of the improved lantern type spring spacer of this invention taken along a line 3—3 of FIG. 1.

As shown in FIG. 3, when a leaf spring 20 is pressed at a projection of the central outwardly bent portion 26 by an external force F caused, for example, by a fuel rod, the flat end portions 24 and 25 are easily bent inwardly because of the smaller resiliency coefficient thereof, and accordingly the leaf spring 20 will assume a slightly depressed position, as shown with phantom lines. It is easily understood that the deformation of the leaf spring 20 does not cause vertical elongation of the lantern type spring spacer 17 because the external force F added to the leaf spring 20 is absorbed by the flat end portions 24 and 25 thereof. Thus, the other leaf springs 21, 22 and 23 remain in their original configurations so that gaps do not occur between their projections and the corresponding fuel rods.

Figure 4:
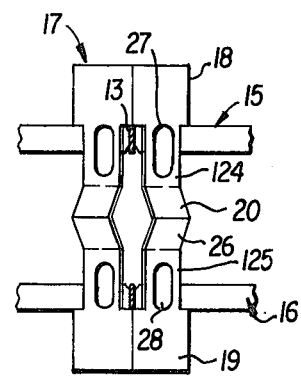
FIG. 4 shows a front view of another embodiment of the improved lantern type spring spacer of the present invention.

Another embodiment of the invention is shown in FIG. 4, in which the flat end portions 124 and 125 of the leaf spring 20 have the same width as the central outwardly bent portion 26, and through openings 27 and 28 are provided in the flat end portions 124 and 125, respectively. In this way, the flat end portions 124 and 125 of this embodiment also are formed to present a smaller coefficient of elasticity than that of the central outwardly bent portion 26.

From the foregoing, in accordance with the present invention, it can be easily understood that the lantern type spring spacer device disclosed herein does not experience elongation when any of the leaf springs therein is pressed by a fuel rod so as to be deformed. Thus, because the other leaf springs of the lantern type spring spacer of the present invention are not influenced by the depressed leaf spring, the problem of fretting of the fuel rods due to vibration is eliminated. Additionally, since the fuel rods are kept in their regular positions when a leaf spring has been pressed by one of the fuel rods, narrowing of the spaces between the fuel rods to obstruct the coolant flow passing therethrough no longer occurs.

Obviously, numerous modifications and variations of the invention are possible in light of the above teachings. It is therefore to be understood that within the scope of the appended claims the invention may be practiced otherwise than as specifically described herein.

What is claimed as new and desired to be secured by Letters Patent of the United States is:

1. A spring spacer device for resiliently supporting nuclear fuel rods comprising:

a latticed frame having a rectangular side frame and a plurality of cross-pieces mounted in said side frame to define a plurality of lattices through which nuclear fuel rods are adapted to respectively be inserted; and a plurality of lantern type spring spacers supported on crossing points of said cross-pieces, each of said lantern type spring spacers including a pair of cylindrical end portions for supporting the lantern type spring spacers on said cross-pieces, and four leaf springs provided between said cylindrical end portions, such that said leaf springs are respectively positioned in corresponding lattices adjacent to each other, each of said leaf springs having flat end portions and a central outwardly bent portion projected against a nuclear fuel rod surface so as to be in contact therewith, said flat end portions of said leaf springs having means for imparting a smaller coefficient of elasticity to said flat end portions than that of said central outwardly bent portion, whereupon a force being applied to said outwardly bent central portion said flat end portions will flex radially inwardly.

2. A spring spacer device according to claim 1, wherein said flat end portions of said leaf springs are formed to have a smaller cross-section than that of said central outwardly bent portion.

3. A spring spacer device according to claim 1, wherein said means of said flat end portions of said leaf springs comprises the width of said flat end portions being less than that of said central outwardly bent portion.

4. A spring spacer device according to claim 1, wherein said means of said flat end portions of said leaf springs comprises at least one through opening provided therein.

5. A spring spacer device according to claim 1, wherein adjacent flat end portions of said leaf springs have slot means interposed therebetween for housing said cross-pieces of said frame.

6. A spring spacer device according to claim 1 wherein said cylindrical end portions are square in cross-section and said flat end portions of said leaf springs are respectively disposed within the planes of the surfaces of said cylindrical end portions when said spring spacer device is in an unstressed state.

* * * * *